United States Patent
Daniel et al.

(10) Patent No.: US 7,441,707 B2
(45) Date of Patent: *Oct. 28, 2008

(54) PROBE SIGNALLING

(75) Inventors: Christopher J. Daniel, Dursley (GB); Peter K. Hellier, North Nibley (GB)

(73) Assignee: Renishaw PLC, Gloucestershire (GB)

( * ) Notice: Subject to any disclaimer, the term of this patent is extended or adjusted under 35 U.S.C. 154(b) by 159 days.

This patent is subject to a terminal disclaimer.

(21) Appl. No.: 10/856,832

(22) Filed: Jun. 1, 2004

(65) Prior Publication Data

US 2004/0219886 A1 Nov. 4, 2004

Related U.S. Application Data

(63) Continuation of application No. 09/959,206, filed as application No. PCT/GB01/00878 on Mar. 1, 2001, now Pat. No. 6,776,344.

(30) Foreign Application Priority Data

Mar. 4, 2000 (GB) .................................. 0005166.4

(51) Int. Cl.
*G06K 7/10* (2006.01)
*G01R 19/00* (2006.01)

(52) U.S. Cl. ............................... 235/472.02; 324/76.11

(58) Field of Classification Search ................. 235/379, 235/375, 472, 472.02; 310/67 R; 250/352; 102/262; 29/613; 415/90; 362/120; 324/76.11
See application file for complete search history.

(56) References Cited

U.S. PATENT DOCUMENTS 3,048,914 A * 8/1962 Kohring ..................... 29/613
RE28,742 E * 3/1976 Rafferty et al. ............... 415/90
4,023,498 A * 5/1977 Harris ....................... 102/262
4,608,763 A 9/1986 Manns et al.
4,670,989 A 6/1987 Juengel
4,717,913 A 1/1988 Elger
5,220,488 A 6/1993 Denes
5,243,430 A 9/1993 Emmons
5,404,016 A * 4/1995 Boyd et al. ................. 250/352
5,473,519 A * 12/1995 McCallops et al. .......... 362/120
5,541,588 A 7/1996 Matsuhashi et al.
5,778,550 A 7/1998 Carli et al.

(Continued)

FOREIGN PATENT DOCUMENTS

DE  41 33 999 A1  4/1993

(Continued)

OTHER PUBLICATIONS

M&h inprocess messtechnik GmbH, "Infrared Probe 25.00-HDR", available on www.mh-inprocess.com, all pages.*

(Continued)

*Primary Examiner*—Thien M Le
*Assistant Examiner*—Thien T Mai
(74) *Attorney, Agent, or Firm*—Oliff & Berridge, PLC

(57) ABSTRACT

A measurement probe for a machine tool has a housing incorporating a window that allows the optical transmission or receipt of signals from/to infrared transmitters or receivers. To obviate the need to mount the transmitter and receiver components on an external surface of the housing, they are surface mounted to a circuit board.

49 Claims, 3 Drawing Sheets

U.S. PATENT DOCUMENTS

| | | | |
|---|---|---|---|
| 5,902,989 A | | 5/1999 | Metlitsky et al. |
| 5,903,369 A | | 5/1999 | Hirayama et al. |
| 6,000,612 A | | 12/1999 | Xu |
| 6,145,746 A | * | 11/2000 | Bard et al. ............. 235/472.01 |
| 6,400,049 B1 | * | 6/2002 | Lai .......................... 310/67 R |
| 6,776,344 B2 | * | 8/2004 | Daniel et al. ........... 235/472.02 |

FOREIGN PATENT DOCUMENTS

| | | |
|---|---|---|
| DE | 299 02 789 U1 | 6/1999 |
| DE | 198 20 358 C1 | 8/1999 |
| EP | 0 587 066 A1 | 3/1994 |
| EP | 0 337 669 B1 | 6/1994 |
| FR | 2 716 318 A1 | 8/1995 |
| FR | 2 756 119 A1 | 5/1998 |
| GB | 2 141 365 | 12/1984 |
| GB | 2 141 365 A | 12/1984 |
| JP | A-60-13202 | 1/1985 |
| JP | A-61-21598 | 1/1986 |
| JP | U-63-17408 | 2/1988 |
| JP | U-63-145109 | 9/1988 |
| JP | U-2-85551 | 7/1990 |
| JP | U-3-67389 | 7/1991 |
| JP | A-7-283563 | 10/1995 |
| JP | A-07-294791 | 11/1995 |
| JP | A-9-201744 | 8/1997 |

OTHER PUBLICATIONS

Infrared Probe 25.00-ADR Product Description, www.mh-inprocess.com, Pre-Mar. 4, 2000.

Leaflet of Blum-Novotest GmbH, Germany, "Multi-function probe for machining center and transfer machine", 1997 (with translation).

Documentation on an exhibition of probes at the "9th control", international trade fair for quality assurance, May 9-12, 1995, Sinsheim, Germany.

Documents on the purchase of probes by Gebr. Heller Maschinenfabrik GmbH, Germany, in 1995.

Documents on the purchase of probes by Makino Inc., USA, in 1999.

Documents in Blum-Novotest GmbH for probes, 1992.

Publication of the probe, "Machine measures work piece", published Oct. 1998, in "Maschine + Werkzeug".

Publication on the probe, "Scanning tooling times", published Nov./Dec. 1998, in the "Werkzeug Technik" journal (with translation).

Publication of the probe, "Fast measuring probe", published Nov. 1998, in the "Werkstatt und Betrieb" journal (with translation).

English translation of Publication of the probe, "Machine measures work piece", published Oct. 1998, in "Maschine + Werkzeug".

Three (3) Undated photographs.

* cited by examiner

PROBE SIGNALLING

This is a Continuation of application Ser. No. 09/959,206 filed Oct. 22, 2001, which in turn is a National Stage of application Ser. No. PCT/GB01/00878 filed Mar. 1, 2001. The entire disclosure of the prior application is hereby incorporated by reference herein in its entirety.

BACKGROUND

The present invention relates to an improved structure for a probe which utilises transmission of signals, e.g. representing stylus triggering information for measuring physical dimensions.

Probes for dimensional measurement have been used without wires for transmitting signals representing coordinates to a fixed base station (e.g. on a machine tool).

Signals are known to be transmitted using infrared light, radio waves or inductively, and a number of transmitters and receivers for the signals are generally mounted on an external surface of the probe. One such probe is shown in European Patent No. 337669.

In hostile conditions these transmitters/receivers can become damaged. Additionally each needs to be sealed against ingress of foreign materials into the probe.

One such commercially available probe uses a window to cover and protect infrared transmitters/receivers. This window can be in the form of an annular ring covering a recessed row of transmitters/receivers. The transmitters/receivers need to be mounted to an external surface of the probe inside the window.

SUMMARY

The present invention provides a measurement probe comprising a housing having a signal transmitter and/or receiver and a circuit board therein and comprising a window transparent to the signal, characterised in that the said transmitter and/or receiver is mounted to the circuit board, adjacent the window.

Preferably the window is in the form of an annulus.

Preferably the said transmitter and/or receiver is a plurality of infrared transmitter and receiver components which may be spaced within and around the annulus. The circuit board may be placed within the annular window and may be bent at lines of weakness. The window may be fully or partially transparent to the light and may include a filter and/or visually attractive coating.

BRIEF DESCRIPTION OF DRAWINGS

Embodiments of the invention are described herein by way of non-limiting example, with reference to the accompanying drawings where.

DETAILED DESCRIPTION OF PREFERRED EMBODIMENTS

Figure 1:
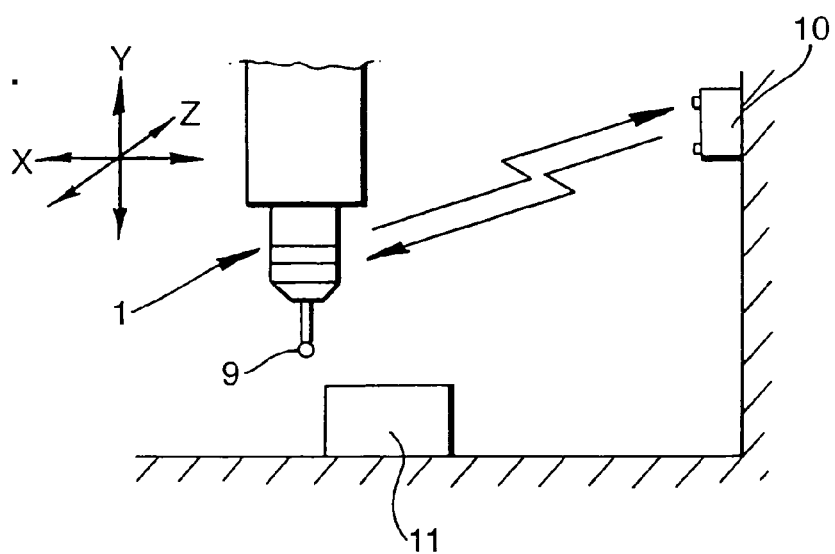
FIG. 1 shows a general view of a probe of the type used for this invention.

Referring to FIG. 1 a probe 1 is shown mounted to a machine. The probe is movable to determine the dimensions of some article 11. Stylus 9 is used to touch the article 11 and determine physical dimensions. Wireless communication is conducted between probe 1 and base station 10, the signals therebetween representing a trigger signal upon contact with the article 11, for example. A plurality of transmitters and/or receivers may be used on the probe to enable uninterrupted communication with the base station. Multiple base stations might be employed, allowing the use of just a single or a few transmitters/receivers in the probe.

Figure 2:
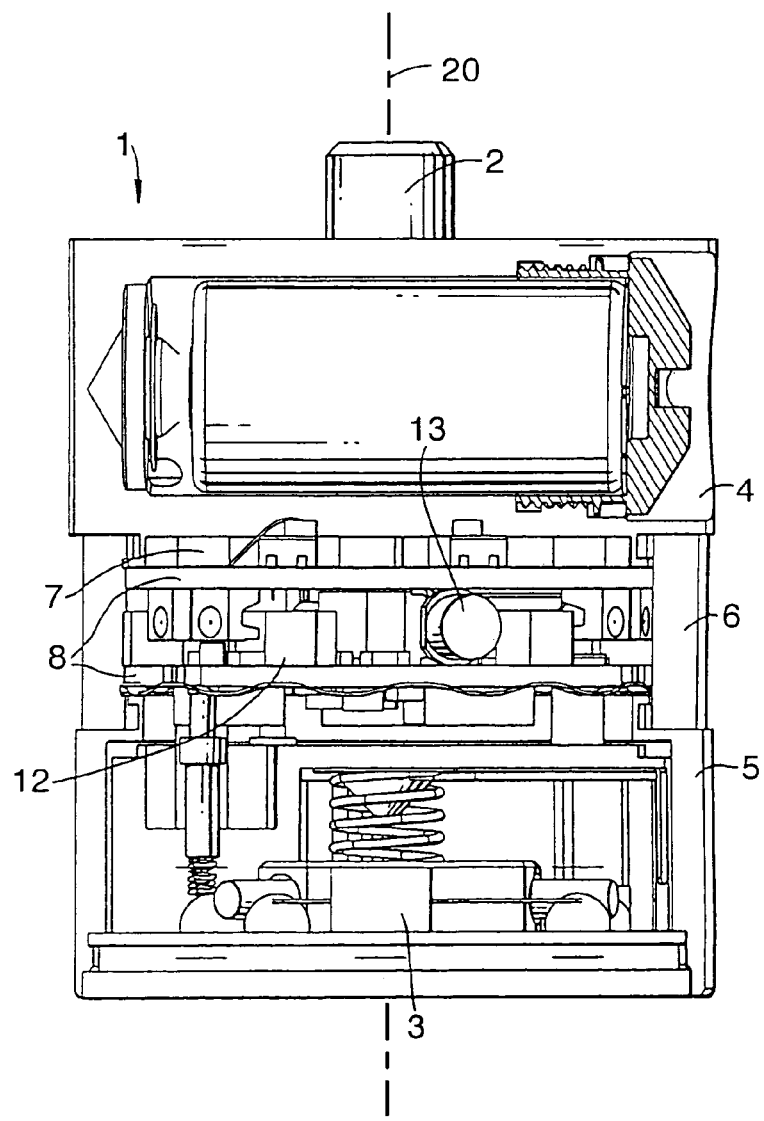
FIG. 2 shows a section of a first embodiment of a probe according to the invention.

Referring to FIG. 2, probe 1 is shown in cross-section. Spigot 2 would in use be mounted to a machine tool shank or the like and measurement stylus 9 would be fitted to stylus holder 3. Upper and lower housing parts 4 and 5 form the body of the probe, together with a signal-transparent annular portion 6. As will be appreciated, a longitudinal axis 20 extends through the housing parts 4 and 5. Three bolts 7 hold the housing parts 4 and 5 together, and clamp therebetween signal-transparent portion 6.

In this embodiment the annular portion is a boro-silicate glass providing a structural element of the probe body and forming a window for infrared light to pass to and from transmitters/receivers 12/13 surface mounted to circuit boards 8 within the probe. In this instance infrared receivers and transmitters and LEDs are surface mounted to the board 8 and infrared light signals can pass through the window 6 from/to base station 10 directly from or to the boards 8. The window is shown sealed at its inner surface, but could of course be sealed at its annular end faces. The window provides a means of filtering unwanted light frequencies.

Figure 3:
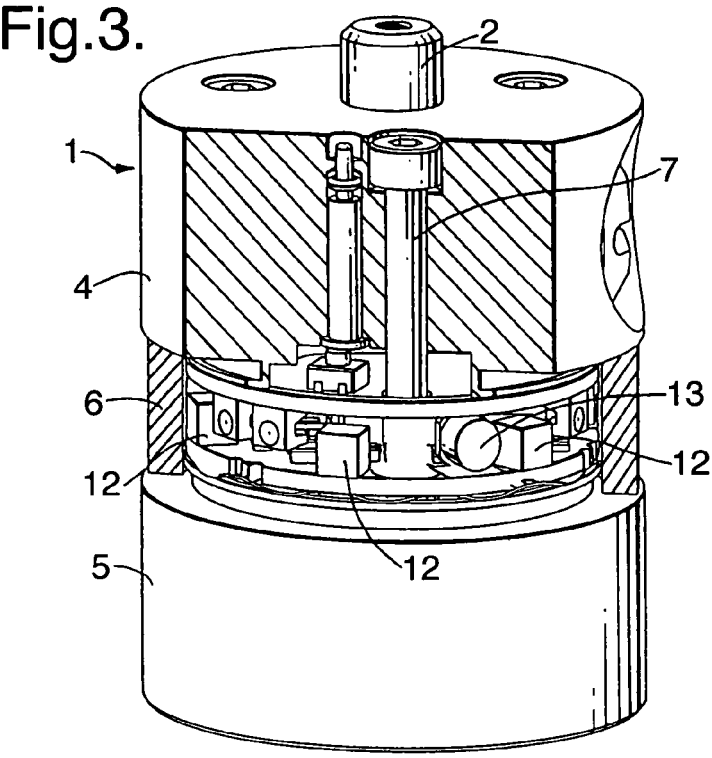
FIG. 3 shows a perspective view, partially sectioned of the probe shown in FIG. 2.

FIG. 3 shows a further view of the probe of the present invention, with like numbered parts.

Figure 5:
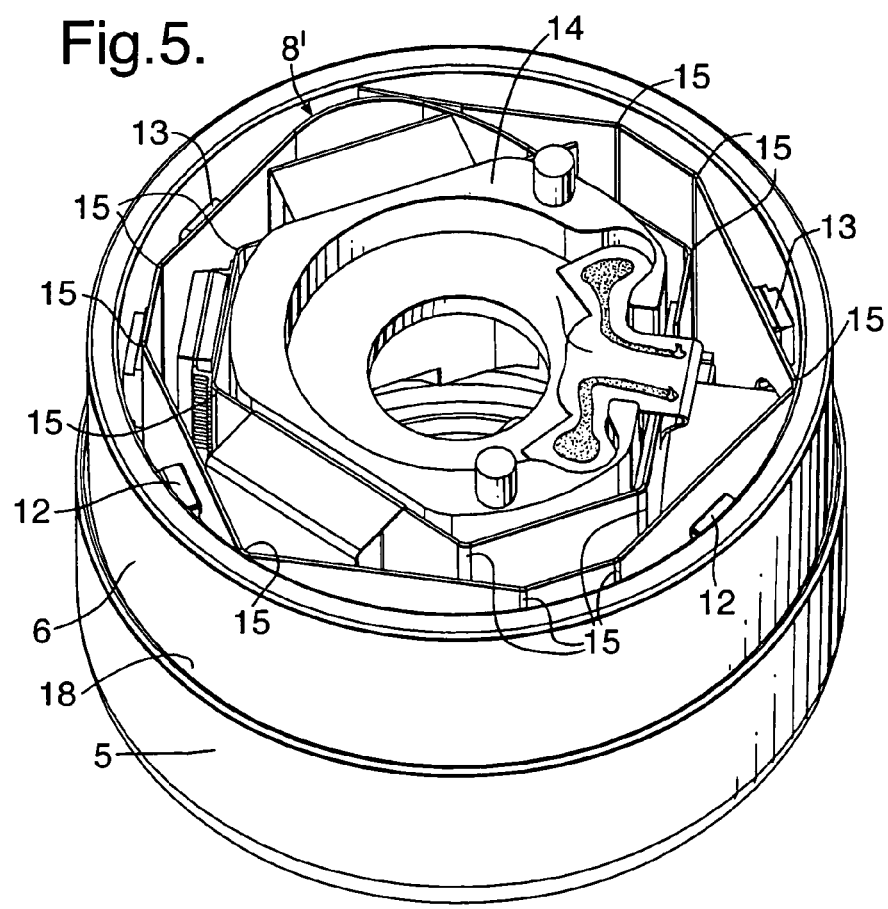
FIGS. 4 and 5 show a second embodiment of a probe according to the invention.
Figure 4:
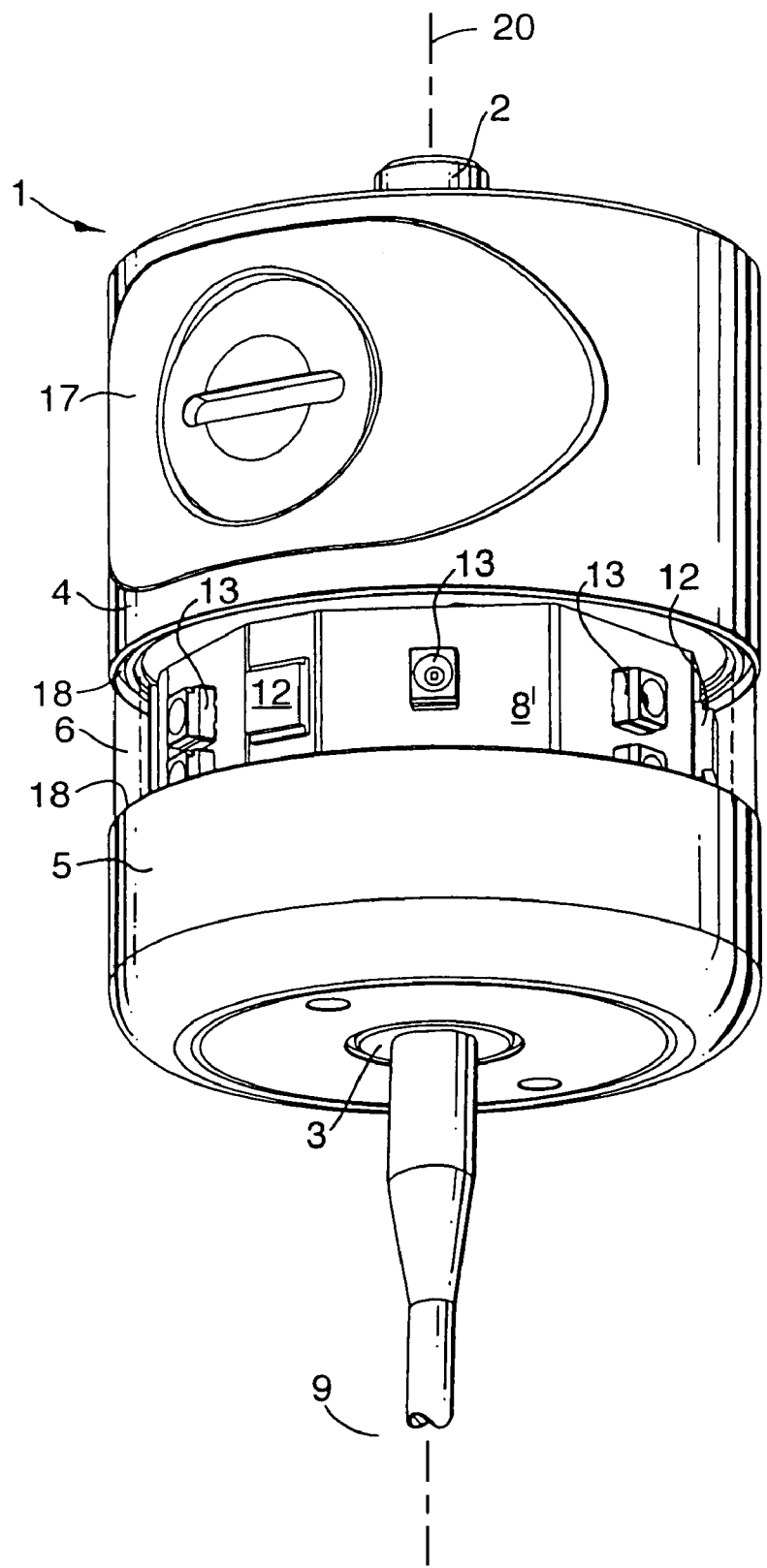

FIGS. 4 and 5 show a modified probe. This embodiment is similar to the embodiment shown in FIGS. 2 and 3. Parts common to the embodiment shown in FIGS. 2 and 3 and the embodiment shown in FIGS. 4 and 5 have like reference numerals.

In this embodiment, upper and lower housing parts 4 and 5 (with longitudinal axis 20) are joined by a central pillar 14, which does not compress annular glass or plastics window 6 other than to provide a seal (at seals 18) around the edges of the window. Therefore, in this embodiment, the window does not form a rigid part of the structure of the probe. Infrared transmitters and receivers 12/13 are spaced around the window 6 and are mounted to the surface of a circuit board 8' inside the probe, e.g., either affixed (e.g., by soldering) directly to the surface of the board or affixed snugly to the board and held in place by through pins (possibly soldered). Circuit board 8' is a relatively rigid substrate bent into a polygon. Bending of the circuit board is made possible by reducing the thickness of the board at intervals to produce lines of weakness (15 FIG. 5). The board can then be bent, at the lines of weakness, into the desired shape.

FIG. 5 shows a view with upper body 4 removed. Circuit board 8' is shown formed around pillar 14 and overlaps itself in order that a larger area of board can be used. Part 16 of the board 8' is used as a contact area for sprung-loaded pins in the upper body 4. The pins (not shown) supply power to the board from a battery compartment 17 in the upper body 4.

The probe shown in FIGS. 4 and 5 like the probe shown in FIGS. 2 and 3 has surface mounted electrical components, in particular infrared transmitters and receivers, within the body of the probe and adjacent a window transparent to infrared light. This construction reduces the complexity of the probe, reduces costs, affords a more reliable seal against the ingress of foreign materials e.g. machining coolant, and reduces the risk of accidental damage of the surface mounted components. No flying leads are required for transmitters/receivers which hitherto were mounted off the circuit boards 8,8'. In the first embodiment, the glass portion 6 forms part of the structure of the probe so a simpler construction is realised.

What is claimed is:

1. A probe for dimensional measurement and for wireless signal communication with a base station, the probe comprising:
    a housing that includes two parts;
    a member that connects the two parts;
    a signal-transparent window that is located between the two parts and extends around the member; and
    a circuit board lying at least partially between the member and the window for the signal communication with the base station.

2. A probe for dimensional measurement as claimed in claim 1, further comprising at least one of a signal transmitter or a signal receiver for the signal communication with the base station mounted on the circuit board.

3. A probe for dimensional measurement as claimed in claim 2, wherein at least one of a plurality of signal transmitters or a plurality of signal receivers are mounted on the circuit board.

4. A probe for dimensional measurement as claimed in claim 3, wherein the at least one of a plurality of signal transmitters or a plurality of signal receivers are positioned on the circuit board near the window.

5. A probe for dimensional measurement as claimed in claim 2, wherein each of the at least one signal transmitter or signal receiver is an optical device operable in the infrared spectrum.

6. A probe for dimensional measurement as claimed in claim 1, wherein the window is substantially annular.

7. A probe for dimensional measurement as claimed in claim 1, wherein the window is a filter.

8. A probe for dimensional measurement as claimed in claim 1, wherein the window is compressed between the two parts.

9. A probe for dimensional measurement as claimed in claim 1, wherein the member connecting the two parts is a pillar joining the two parts.

10. A probe for dimensional measurement as claimed in claim 1, wherein the circuit board is bent around the member and is near the window.

11. A probe for dimensional measurement as claimed in claim 1, wherein a seal is provided between the window and the two parts.

12. A probe for dimensional measurement and for optical wireless signal communication with a base station, the probe comprising:
    a housing that includes two substantially cylindrical parts;
    a member that connects the two parts;
    a substantially annular signal-transparent window that is located between the two parts and extends around the member;
    a circuit board lying at least partially between the member and the window; and
    at least one of a plurality of transmitters or a plurality of receivers mounted on the circuit board near the window for the optical signal communication with the base station.

13. A probe for dimensional measurement and for optical wireless communication with a base station, the probe comprising:
    a housing;
    a signal-transparent window;
    a circuit board; and
    at least one of an optical signal transmitter or an optical signal receiver, wherein:
        the circuit board is within the housing,
        the window is transparent to an optical signal,
        each of the at least one transmitter or receiver is mounted solely to the circuit board and is near the window for optical signal communication with the base station during use, and
        the circuit board is bent and positioned within the housing near the window.

14. A probe as claimed in claim 13, wherein the window is substantially annular.

15. A probe as claimed in claim 13, wherein the circuit board includes at least one of a plurality of transmitters or a plurality of receivers near the window.

16. A probe as claimed in claim 15, wherein the at least one of a plurality of transmitters or a plurality of receivers are positioned on the circuit board near the window.

17. A probe as claimed in claim 13, wherein each of the at least one transmitter or receiver is operable in the infrared spectrum.

18. A probe as claimed in claim 13, wherein the window is a filter.

19. A probe as claimed in claim 13, wherein the housing includes two parts, with the window separating the two parts.

20. A probe as claimed in claim 19, wherein the circuit board is formed around a pillar joining the two parts.

21. A probe for dimensional measurement as claimed in claim 1, wherein the member that connects the two parts comprises a plurality of bolts.

22. A probe for dimensional measurement as claimed in claim 12, wherein the member that connects the two parts is a pillar joining the two parts.

23. A probe for dimensional measurement as claimed in claim 12, wherein the circuit board is bent around the member and is near the window.

24. A probe for dimensional measurement as claimed in claim 12, wherein a seal is provided between the window and the two parts.

25. A probe for dimensional measurement as claimed in claim 12, wherein the member that connects the two parts comprises a plurality of bolts.

26. A probe for dimensional measurement and for optical wireless signal communication with a base station, the probe comprising:
    a housing that includes two substantially cylindrical parts;
    a member that connects the two parts;
    a substantially annular signal-transparent window that is located between the two parts and extends around the member;
    a circuit board; and
    at least one of a plurality of transmitters or a plurality of receivers mounted on the circuit board, wherein:
        at least a part of the circuit board is positioned between the member and the window,
        the part of the circuit board that is positioned between the member and the window has the at least one of a plurality of transmitters or a plurality of receivers mounted thereon and the at least one of a plurality of transmitters or a plurality of receivers are positioned near the window for the optical signal communication with the base station.

27. A probe according to claim 26, wherein the member comprises a plurality of bolts, with the bolts passing through the circuit board.

28. A probe according to claim 26, wherein a plurality of transmitters and a plurality of receivers are mounted on the circuit board.

29. A probe for dimensional measurement as claimed in claim 12, wherein the at least one of a plurality of transmitters or a plurality of receivers are mounted on the circuit board between the member and the window.

30. A probe for dimensional measurement as claimed in claim 1, wherein the member extends through the circuit board.

31. A probe for dimensional measurement as claimed in claim 12, wherein the member extends through the circuit board.

32. A probe for dimensional measurement as claimed in claim 3, wherein a plurality of signal transmitters and a plurality of signal receivers are mounted on the circuit board.

33. A probe for dimensional measurement as claimed in claim 12, wherein a plurality of transmitters and a plurality of receivers are mounted on the circuit board near the window.

34. A probe for dimensional measurement as claimed in claim 16, wherein a plurality of transmitters and a plurality of receivers are mounted on the circuit board near the window.

35. A probe for dimensional measurement and for optical wireless communication with a base station, the probe comprising:
   a housing that includes two parts;
   a member that connects the two parts;
   a signal-transparent window that is located between the two parts and extends around the member;
   a circuit board; and
   at least one of an optical signal transmitter or an optical signal receiver mounted on the circuit board, wherein:
      the member extends through the circuit board,
      the at least one of an optical signal transmitter or an optical signal receiver is mounted on the circuit board near the window, and
      optical signals may pass through the window for the optical wireless communication with the base station.

36. A probe according to claim 35, wherein a plurality of transmitters and a plurality of receivers are mounted on the circuit board.

37. A probe for dimensional measurement and for optical wireless communication with a base station, the probe comprising:
   a housing that includes two parts;
   a member that connects the two parts;
   a signal-transparent window that is located between the two parts and extends around the member;
   a circuit board; and
   at least one of an optical signal transmitter or an optical signal receiver mounted at an outer circumferential surface of the circuit board, wherein:
      an inner radial surface of the member is located inward of the outer circumferential surface, and
      optical signals may pass through the window for the optical wireless communication with the base station.

38. A probe for dimensional measurement and for optical wireless communication with a base station, the probe comprising:
   a housing that includes two parts;
   a member that connects the two parts;
   a signal-transparent window that is located between the two parts and extends around the member;
   a circuit board; and
   at least one of an optical signal transmitter or an optical signal receiver mounted on the circuit board, wherein:
      a distance between the window and the at least one of an optical signal transmitter or an optical signal receiver is less than a distance between the window and the member, and
      optical signals may pass through the window for the optical wireless communication with the base station.

39. A probe for dimensional measurement and for optical wireless communication with a base station, the probe comprising:
   a housing with a longitudinal axis;
   a generally planar circuit board positioned substantially perpendicular to the longitudinal axis;
   a signal-transparent window surrounding the circuit board near an outer periphery of the circuit board; and
   at least one of an optical signal transmitter or an optical signal receiver mounted on the circuit board near the window,
   wherein optical signals may pass through the window for the optical wireless communication with the base station.

40. A probe for dimensional measurement as claimed in claim 39, comprising:
   a mounting spigot located at one end of the housing; and
   a stylus holder supported at an opposite end of the housing,
   wherein the longitudinal axis extends through the housing in a direction from the spigot to the stylus holder.

41. A probe for dimensional measurement as claimed in claim 39, wherein a plurality of transmitters and a plurality of receivers are mounted on the circuit board near the window.

42. A probe for dimensional measurement as claimed in claim 39, wherein the window is substantially annular.

43. A probe for dimensional measurement as claimed in claim 39, wherein each of the at least one signal transmitter or signal receiver is an optical device operable in the infrared spectrum.

44. A probe for dimensional measurement and for optical wireless communication with a base station, the probe comprising:
   a housing with a longitudinal axis;
   a circuit board positioned around and generally concentric with the longitudinal axis, such that an electronic component mounting surface of the circuit board is substantially parallel to the longitudinal axis;
   a substantially annular signal-transparent window surrounding the circuit board near the mounting surface of the circuit board, such that the mounting surface faces the window; and
   at least one of an optical signal transmitter or an optical signal receiver mounted on the mounting surface of the circuit board,
   wherein optical signals may pass through the window for the optical wireless communication with the base station.

45. A probe for dimensional measurement as claimed in claim 44, wherein the at least one of an optical signal transmitter or an optical signal receiver is mounted solely to the circuit board.

46. A probe for dimensional measurement as claimed in claim 44, comprising:

a mounting spigot located at one end of the housing; and a stylus holder supported at an opposite end of the housing, wherein the longitudinal axis extends through the housing in a direction from the spigot to the stylus holder.

47. A probe for dimensional measurement as claimed in claim 44, wherein the housing comprises two parts connected by a member, and the circuit board is located between the member and the window so as to surround the member.

48. A probe for dimensional measurement as claimed in claim 44, wherein a plurality of transmitters and a plurality of receivers are mounted on the mounting surface of the circuit board.

49. A probe for dimensional measurement as claimed in claim 44, wherein each of the at least one signal transmitter or signal receiver is an optical device operable in the infrared spectrum.

* * * * *